US006775432B2

(12) United States Patent  
Basu (10) Patent No.: US 6,775,432 B2  
(45) Date of Patent: Aug. 10, 2004

(54) METHOD AND APPARATUS FOR OPTICAL WAVELENGTH DEMULTIPLEXING, MULTIPLEXING AND ROUTING

(75) Inventor: Santanu Basu, 6710 Abbottswood Dr., Rancho Palos Verdes, CA (US) 90275

(73) Assignee: Santanu Basu, Rancho Palos Verdes, CA (US)

( * ) Notice: Subject to any disclaimer, the term of this patent is extended or adjusted under 35 U.S.C. 154(b) by 440 days.

(21) Appl. No.: 09/998,842

(22) Filed: Oct. 19, 2001

(65) Prior Publication Data

US 2003/0077029 A1 Apr. 24, 2003

(51) Int. Cl.[7] .............................. G02B 6/28; G02B 6/34; H04J 14/02
(52) U.S. Cl. ......................................... 385/24; 398/118
(58) Field of Search ............................. 385/24, 31, 39, 385/127, 128, 141; 398/118, 119, 120, 121

(56) References Cited

U.S. PATENT DOCUMENTS

| 4,111,524 | A | * | 9/1978 | Tomlinson, III | 385/37 |
| 4,198,117 | A | * | 4/1980 | Kobayashi | 385/37 |
| 5,119,454 | A | * | 6/1992 | McMahon | 385/49 |
| 5,786,915 | A | * | 7/1998 | Scobey | 398/82 |
| 5,930,045 | A | * | 7/1999 | Shirasaki | 359/577 |
| 5,969,866 | A | * | 10/1999 | Shirasaki | 359/577 |
| 6,415,080 | B1 | * | 7/2002 | Sappey et al. | 385/37 |
| 2002/0181856 | A1 | * | 12/2002 | Sappey et al. | 385/24 |

\* cited by examiner

*Primary Examiner*—Akm Enayet Ullah  
(74) *Attorney, Agent, or Firm*—Stetina Brunda Garred & Brucker (57) ABSTRACT

This invention relates to demultiplexing, routing and multiplexing of a number of different optical wavelength channels. The demultiplexer provides a basis for robust designs of multi-channel optical communication receiver, spectrum analyzer and router. The demultiplexer is operationally bi-directional providing a means for multiplexing.

52 Claims, 6 Drawing Sheets

METHOD AND APPARATUS FOR OPTICAL WAVELENGTH DEMULTIPLEXING, MULTIPLEXING AND ROUTING

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

This invention relates to demultiplexing, routing and multiplexing of a number of different optical wavelength channels. The demultiplexer provides a basis for robust designs of multi-channel optical communication receiver, spectrum analyzer and router. The demultiplexer is operationally bi-directional providing a means for multiplexing.

DESCRIPTION OF THE PRIOR ART

Wavelength division multiplexing is a very important function in optical communication. To increase the system bandwidth, it is common to propagate a number of wavelength separated channels over the same carrier (such as an optical fiber or waveguide), and the objective of a wavelength division demultiplexer is to separate the channels in such a way that the signals can be routed to individual destinations. In general, an intensity or phase modulated optical beam of a certain wavelength constitutes a channel in optical communication. The objective of a wavelength division multiplexer is to combine the channels at different wavelengths from separate sources so that they can simultaneously be propagated over a common carrier. For this application, we use the term WDM to denote both demultiplexing and multiplexing of channels of different wavelengths. We use the term DWDM to denote WDM devices which operate on a large number of very closely spaced typically (100 GHz for ITU-T DWDM grid) wavelength channels.

WDM function requires wavelength selective devices such as prisms, gratings, interference filters and waveguides, which can be found in the literature as prior art. The drawback of all previous approaches is that when the channel separation becomes small, such as ~0.8 nm (~\100 GHz) around 1550 nm center wavelength, and the number of channels are large (>8), the DWDM devices become bulky and have tight dimensional tolerances, which affect manufacturability and reliability of operation. Majority of the techniques are temperature and stress sensitive, and some of the approaches have large differential loss among DWDM channels and large cross talk between nearby channels.

It is therefore an object of the present invention to provide an apparatus and associated methods to combine a wavelength separation element such as a grating with a series of internal reflection surfaces which are positioned within a range of angles near critical angle in a way that channels separate out one at a time by becoming transmissive at the internal reflection surfaces, and the remaining channels propagate to the next internal reflection surface with insignificant loss following a total internal reflection from the previous surface. This results in physical separation of the optical channels. The process is bi-directional, and propagation in the other direction combines a number of wavelength separated channels into a single beam resulting in multiplexing. The separated channels can be imaged into individual carriers such as fibers, when the apparatus works as a router or a demultiplexer.

In one feature of the invention, a number of internal reflecting surfaces at near critical angle is provided in a single optical element, which is configured as a slab of a low-loss optical material. The signal to be demultiplexed propagates through the slab by bouncing back and forth between the top and bottom surfaces of the slab. The incidence angle at the first bounce is designed such that it exceeds the critical angle for total internal reflection for all but one wavelength channel, which becomes partially transmitted out of the optical slab. A critical feature of the present invention is that the incidence angle of the optical beam at the top and bottom slab surfaces is gradually reduced from bounce to bounce by providing a small inclination angle between the top and the bottom faces of the slab. The incidence angle of the beam progressively reduces from bounce to bounce in a way that one wavelength channel at a time emerges from one of the slab surfaces by switching from being totally internally reflective to partially transmissive.

In another embodiment of the invention, a grating disperses the input optical beam such that the beams of different wavelengths propagate at different angles leaving the grating. The beams then enter the slab and are incident at slightly different angles on the first surface. The geometry is designed such that incidence angle of either the longest or the shortest wavelength channel falls below the critical angle, and is partially transmitted out of the slab waveguide. The remaining beams propagate to the other surface, which is inclined with respect to the first surface with the sign (positive or negative) such that the incidence angle of all the wavelength channels is reduced at this surface by the fixed "slab inclination angle". The "slab inclination angle" is designed such that the incidence angle for only one other wavelength channel falls below the critical angle, and the second wavelength is partially transmitted out of the optical slab. The remaining beams propagate to the first surface, the incidence angle is again decreased by the "slab inclination angle", and a third wavelength channel escapes the slab through transmission. The process continues until all channels exit the slab at various physical locations and are therefore separated. We use the term SIR ports to denote the regions on the slab top and bottom surfaces which act as ingress/exit points for wavelength channels and where the internally reflected beam touches the slab surface.

In another feature of the invention, other wavelength separating devices such as prisms can be used to replace the grating.

In another feature of the invention, the input beam to the optical slab is polarized such that the partial transmission at the slab faces near critical angle is maximized (polarization parallel to the plane of incidence for example).

In another feature of the invention, the input beam comes from an input optical fiber and is collimated using a lens prior to its incidence on the grating surface.

In another feature of the invention, the physical separation from the channels on either the top or the bottom face of the slab can be linearly increased with the slab thickness.

In another feature of the invention, the transmitted angle is very sensitive to the incidence angle at near the critical angle, which amplifies the angular separation imposed on the channels by the grating or another dispersive element. The exploitation of this phenomenon which aids in channel separation is a key feature of this invention. This provides a means for easier blocking of unwanted channels using baffles, which leads to low cross talk among nearby channels.

In another feature of the invention, the optical slab can be made longer than the minimum required to provide additional internal reflection ports which can accommodate variations in manufacturability and operating conditions. In some cases, a designated channel skips a slab internal reflection port by not being incident at less than the critical angle, and emerges from the next slab internal reflection port.

In another feature of the invention, the optical slab can be fabricated with much higher precision than is required in the present invention for slab inclination angle, the flatness of the slab top and bottom surfaces, the optical quality of the surfaces, and propagation loss through the slab.

In another feature of the invention, the input and the exit faces of the slab can be antireflection coated for the wavelength channels.

In another feature of the invention, the top and bottom surfaces of the optical slab may be protected from nearby coupling optics and detectors using mechanical means.

In another feature of the invention, the top and bottom faces of the optical slab may have a lower index optical layer of material which preserve the low loss for the totally internally reflecting beams inside the optical slab, allow transmission of the separated channels, and also physically protect the optical slab when the coupling optics and detectors are used in close proximity of the slab faces.

In another feature of the invention, temperature dependence of channel separation process in the optical slab is weak, due to weak dependence of critical angle on temperature, and due to weak dependence of incidence angles of the propagating beam on uniform expansion or contraction of the slab.

In another feature of the invention, one or more reference wavelength channels may be added to the input signal, which can be monitored at specific slab internal reflection ports, and the entire demultiplexed channels can be simultaneously optimized and tuned in wavelength by changing one angle, which is the relative angle between the slab and one of the reference wavelength input beams, since the relative angular positions of the channels remain constant in the slab.

In another feature of the invention, the slab thickness and the number of channels are designed with considerations such that the beam size within the slab do not expand significantly by diffraction by propagation through the slab.

In another feature of the invention, each channel is attenuated after its first separation by transmission due to transmission at each successive SIR ports. The attenuation and transmission are polarization dependent and can be controlled through polarization selection elements.

In another feature of the invention, the number of channels are selected such that there is minimum overlap at either the top or the bottom face of the slab between the central ray of one wavelength channel leaving the surface and the central ray of another wavelength channel being incident on the surface, when the two wavelength channels are of comparable strength.

In another feature of the invention, the demultiplexed wavelengths are either directly sampled by detectors at the slab internal reflection ports (SIR ports), or are mode-matched using lenses to couple into detectors. This leads to the construction of a multi-channel communication receiver, spectrum analyzer or the like.

In another feature of the invention, the demultiplexed wavelengths are mode-matched using lenses to couple into receiving carriers such as optical fibers or waveguides. This leads to the construction of a wavelength router or demultiplexer.

In another feature of the invention, a series of reflective surfaces divert the transmitted beams to a direction nearly normal to the slab face for ease of channel separation, and coupling into receiving carriers.

In another feature of the invention, since the grating dispersion and multiple reflection processes in the slab are bi-directional, a series of wavelength separated channels coming from a series of transmitting carriers such as optical fibers or waveguides can be multiplexed into a single optical beam, and be coupled into a receiving carrier. This leads to the construction of a wavelength multiplexer and router.

SUMMARY OF THE INVENTION

These and other objects are achieved by the various apparatus and associated method of the present invention.

In a broad aspect, the present invention provides a method for wavelength demultiplexing of a plurality of inputted optical signals having different corresponding wavelengths. The method includes angularly dispersing the inputted optical signals based on the signal wavelength; extracting each of the signals by directing the optical signals to a plurality of reflecting surfaces, each of the reflecting surfaces being arranged at a dedicated angle of inclination wherein the dispersion angle of each optical signal causes a reflective surface arranged at a corresponding angle of inclination to become substantially transmissive to a signal to be extracted while remaining substantially reflective to other signals; and directing the extracted signals to a plurality of signal carrier medium for transmission to at least one predetermined destination.

In another aspect, the present invention is a method for wavelength multiplexing of a plurality of inputted optical signals having different corresponding wavelengths. The method includes directing the inputted signals from a plurality of signal carrier medium to enter an optical medium at a corresponding predetermined entrance point; confluxing each of the entered signals by directing the optical signals to a plurality of reflecting surfaces, each of the reflecting surfaces being arranged at a dedicated angle of inclination to become substantially transmissive to an entered signal at the predetermined entrance point while remaining substantially reflective to other signals; and angularly collimating the confluxed optical signals into a single signal waveform and directing the waveform to a signal carrier medium.

In a third aspect, the present invention is an apparatus for wavelength demultiplexing of a plurality of inputted optical signals having different corresponding wavelengths. The apparatus includes an angular dispersion device to angularly disperse the inputted optical signals based on the signal wavelength; a signal extraction device to extract each of the signals by directing the optical signals to a plurality of reflecting surfaces, each of the reflecting surfaces being arranged at a dedicated angle of inclination wherein the dispersion angle of each optical signal causes a reflective surface arranged at a corresponding angle of inclination to become substantially transmissive to a signal to be extracted while remaining substantially reflective to other signals; and a beam directing device to direct the extracted signals to a plurality of signal carrier medium for transmission to at least one predetermined destination.

In yet a fourth aspect, the present invention is an apparatus for wavelength multiplexing of a plurality of inputted optical signals having different corresponding wavelengths. The apparatus includes a beam directing device to direct the inputted signals from a plurality of signal carrier medium to enter an optical confluxing medium at a corresponding predetermined entrance point, the optical medium having a plurality of reflecting surfaces, each of the reflecting surfaces being arranged at a dedicated angle of inclination to become substantially transmissive to an entered signal at the predetermined entrance point while remaining substantially reflective to other signals, the medium to conflux the inputted signals; and an angular collimating device to angularly collimate the confluxed optical signals based on the signal wavelength angularly and to direct the waveform to a signal carrier medium.

The aforementioned summary descriptions were intended to only provide an overview of the exemplary embodiments of the present invention. A more detailed understanding of these features, and of additional features, objects, and advantages of the present invention will be provided to those skilled in the art from a consideration of the following Detailed Description of the Invention, taken in conjunction with the accompanying Drawings, which will now first be described briefly.

Other features and advantages of the present invention will become apparent upon a perusal of the following specifications taken in connection with the accompanying drawings.

DETAILED DESCRIPTION OF THE INVENTION

Figure 1A:
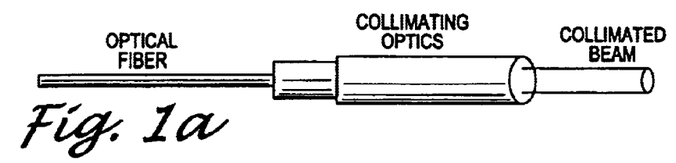
FIG. 1a is a schematic of an optical carrier, which in this case is an optical fiber which is terminated with a collimating lens.

FIG. 1a is a schematic of an optical carrier, containing the wavelength multiplexed channels or an individual wavelength channel, and which in this example is an optical fiber which is terminated with a collimating lens. The fiber can be single mode (or, multimode), and may be terminated with a fiber-pigtailed collimator, such as Newport model F-COL-9-15. The collimator in this case uses a 0.25 pitch GRIN lens of 2 mm diameter. The confocal parameter for a 1 mm beam waist at 1550 nm is approximately 4 m, which is substantially greater than the path length through the demulitplexers/multiplexers considered in this patent. Other carriers such as waveguides and other coupling optics may also be used.

Figure 1B:
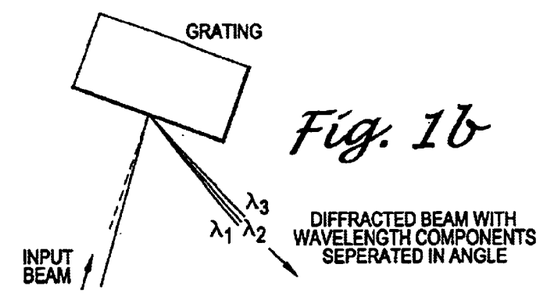
FIG. 1b is a schematic of a wavelength dispersing element, which is a grating in this case.

FIG. 1b shows one embodiment of a wavelength dispersing element, which is a diffraction grating. Other passive wavelength dispersing elements such as prisms or active dispersing elements such as acousto-optic or Brillouin gratings may also be used. The grating may be a blazed grating for improved thruput, or a holographic grating for improved wavelength dispersion. For the particular design examples in this invention, a 600 lines per mm gold-coated grating which is blazed at 28 degree 41 min at 1600 nm, and which is made by Edmund Scientific, part number NT 54-850 was considered. For the holographic grating, a 1200 grooves per mm made by Edmund Scientific, part number NT 43-773, and a 900 lines per mm variation were considered. The choice of the grating is primarily dictated by the grating resolution, wavelength of operation, channel spacing, grating reflectivity and polarization dependence.

Figure 1C:
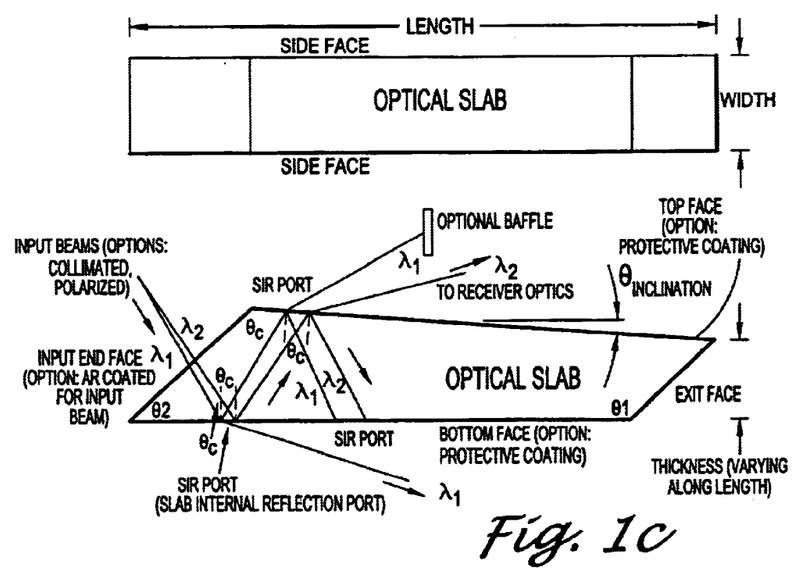
FIG. 1c shows a bulk optical slab having its top and bottom surfaces at an inclination angle, and the principle of demultiplexing of channels of different wavelengths entering an optical slab at different angles.

FIG. 1c shows one embodiment of a bulk optical slab which acts as a multiport channel separator. The optical slab can be made of crystalline, amorphous or polymeric material, with or without nonlinear optical properties. In general, the desirable properties are low absorption at channel wavelengths, ease of fabrication and polishing and good thermo-mechanical and chemical properties within the operating environment. In general, a high refractive index is preferred, which increases the sensitivity of the transmitted beam angle to the incident beam angle at near the critical angle of incidence. The slab may be formed from one bulk substrate or may be formed by deposition or bonding of layers. Examples of materials which can be used for the slab include garnets such as YAG, optical glass and diffusion bonded GaAs, but other choices are possible.

We illustrate the nomenclature with respect to the slab in the figure. We use the term SIR ports to denote the regions on the top and bottom slab surfaces which act as ingress/exit points for wavelength channels and where the internally reflected beam bounces off of the slab surfaces. The top surface of the slab is at an angle of $\theta_{inclination}$, with respect to the bottom surface as illustrated in the FIG 1c. In this case $\theta_{inclination}$ is of the sign such that the slab thickness decreases along the length of the slab in the general direction of propagation of the internally reflected beam. Let us consider two optical beams entering the slab from the input end face, and incident on the slab bottom face at different locations and at slight varying incident angles. This is similar to a situation when these beams are at different wavelengths and are being diffracted by a grating or a prism. If the incidence angle at SIR port 1 for channel $\lambda 1$ is less than the critical angle for the slab/air interface, but the incidence angles for channel $\lambda 2$ is slightly greater than the critical angle, then a portion of channel $\lambda 1$ can be coupled out of the slab at this port, while channel $\lambda 1$ remains confined by total internal reflection within the slab. The transmitted fraction depends on the angle of incidence and polarization of channel $\lambda 1$. The thruput of the demultiplexer and low cross talk condition are more favorable for a polarized input beam with the plane of polarization parallel to the plane of incidence than for an unpolarized or an orthogonally polarized input beam. A small fraction of channel λ1 will be reflected inside the slab. The incidence angles of both the wavelength channels at the next bounce, which is at the top surface will decrease by the slab inclination angle, $\theta_{inclination}$. Now, if the incidence angle of channel λ2 becomes less than the critical angle on the top surface, as shown in the figure, a fraction of channel λ2 and a fraction of remainder of channel λ1 at this location will couple out of the slab. Because the external transmitted angles are very sensitive to the incidence angle near the critical angle, an amplification takes place in the angle space. The exploitation of this phenomenon which aids in channel separation is a key feature of this invention. A significant portion of the channel λ2 beam and a small portion of the channel λ1 beam will propagate at different angles out of the slab. For more than two wavelengths, the process continues until different channels emerge from different SIR ports of the slab.

The beams from adjacent transmitting channels in general start out as overlapped beams at the SIR ports, but quickly physically separate out leaving the slab due to the accumulated angular separation imposed by the grating and the slab. A propagation path is allowed between the exit location and the coupling optics for the channels to be separated as shown in the figure. The cross talk is further minimized by easy implementation of baffles, and the fact that the channels which reached transmission condition at previous ports have attenuated in intensity.

The novel use of the slab with two faces at an angle of inclination in combination with a wavelength dispersing element leads to the following characteristics which will be exploited in designs of DWDM demultiplexer/router/multiplexer/receiver and similar devices:

a. The two slab faces at an inclination provides for a regular and predetermined variation in the incidence angle as the signal propagates through the slab with minimum loss at the total internal reflection surfaces. The channels emerge from the slab at physically separated SIR ports.

b. Operation at incidence angles near critical angle of incidence acts as an angle amplifier on the small angular separation imposed by the wavelength dispersing element. For the case illustrated in FIG. 2, the separation angle amplification was 12.6.

c. The beam to be demultiplexed comes in contact with a large number of internal reflection surfaces in a small single optical element (slab) which leads to (1) low loss due to beam spreading, (2) robust design with insensitivity to operational conditions, and (3) ease of manufacturability.

d. The operation of the device is bi-directional. Both multiplexing and demultiplexing are possible with the same grating and optical slab combination.

e. As compared to interference filter and cavity resonance based demultiplexer devices, the method and apparatus described here is relatively temperature insensitive. Any temperature variation in the slab acts uniformly on all wavelengths to first order, and the effect of temperature induced refractive index change on the slab critical angle is small compared to the angular separation of the channels. Also, the method includes the option to keep the transmitted beam locations aligned with the coupling optics and detectors for the demultiplexer by using a number of reference channels. Once these reference channels are aligned to their SIR ports by monitoring their intensities, all other wavelength channels are automatically aligned to their respective coupling optics at their SIR ports. Channel to channel angular separation and transmission condition remains constant through the process of sequential demultiplexing as the beam traverses the slab.

Figure 2:
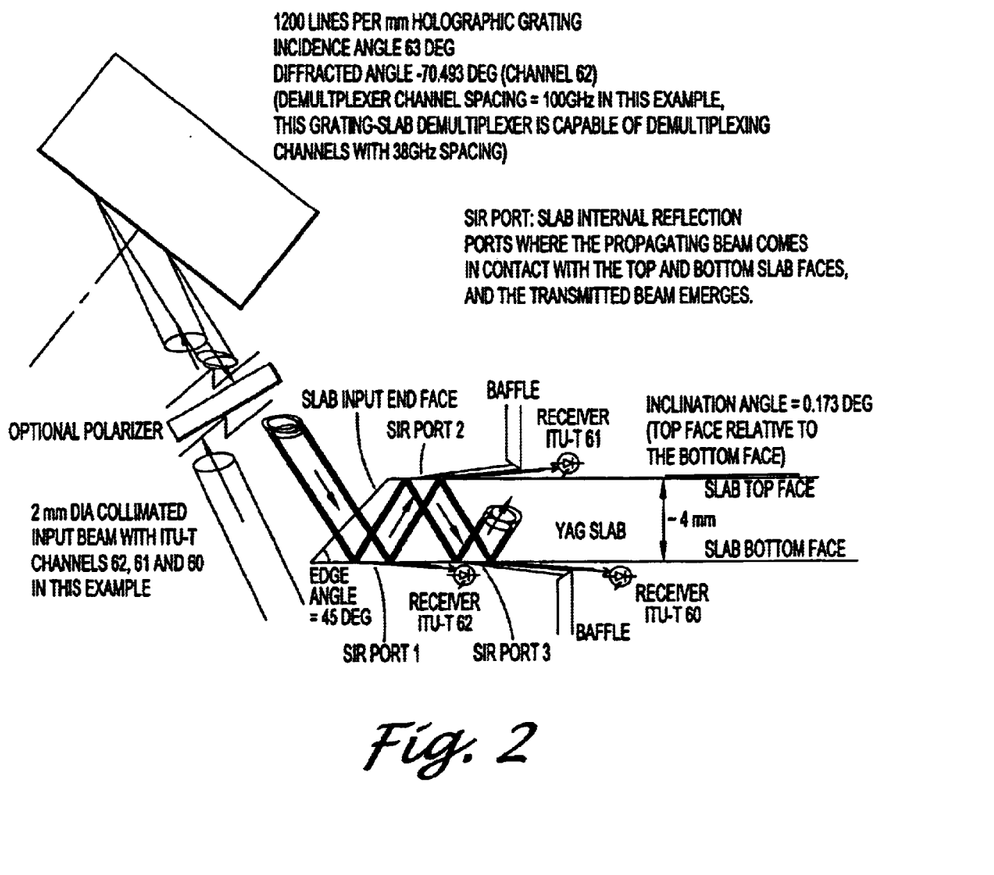
FIG. 2 illustrates the geometry of the demultiplexer of the three adjacent channels in ITU-T DWDM grid (Channel spacing=100 GHz).

FIG. 2 illustrates the geometry of the demultiplexer example of the three adjacent channels in ITU-T DWDM grid (Channel spacing=100 GHz). The input fiber with a collimator emits a 2-mm diameter beam carrying three channels on the ITU-T DWDM grid, which for this design example, are channels 62, 61 and 60 with channel to channel wavelength separation of ~0.8 nm or 100 GHz. The beam is incident at 63 degree with respect to the normal on a 1200 lines per mm holographic grating. The diffracted angle for channel 62 is negative 70.493 degree. Channel 62 goes through the AR coated input face of the YAG slab (refractive index=1.82), and is incident on the bottom face at an angle of 33.285 deg. Where the slab-air critical angle is 33.329 deg. 35% of the parallel polarized radiation and 12% of the perpendicular polarized radiation in channel 62 escape the slab at a transmitted angle of 87.2 deg. The incident angles for channels 61 and 60 are 33.374 and 33.463 degrees, and they undergo total internal reflection at SIR port 1. The slab thickness for this example is 4 mm at the input face, and the inclination angle, $\theta_{inclination}$ is 0.0884 deg. The beams then proceed to SIR port 2, where the incidence angles are reduced by 0.0884 deg, and a part of channel 61 is transmitted out at SIR port 2. The transmitted angles for channels 62 and 61 at SIR port 2 are 85.15 deg and 87.226 deg. A baffle is placed near SIR port 2 as shown in the figure to eliminate any remaining channel 62 signal from going into the detector for channel 61. The transmitted beams are now separated by 2.036 deg, while the grating produced an angular separation of only 0.161 deg between channel 62 and 61. The angle separation amplification is thus 12.6, which is a key feature of this invention.

Channel 60 is transmitted out of the slab from SIR port 3. The transmitted angles are 83.8, 85.2 and 87.25 deg for channels 62, 61 and 60 respectively. The process continues in the same way for more channels.

The resolution of the grating is 0.29 nm, while the wavelength separation between channel 62 and 61 is 0.78 nm. Thus the two channels are well separated in this device. In the limit of operation, two channels separated by 0.29 nm or 37 GHz can be separated by this device. The transmitted angle separation for 37 GHz line spacing will be 1 deg, and at a short distance from the SIR port, the two adjacent channels will be physically separated. For ease of coupling to output channel fibers or to channel detectors, a typical slab thickness may be chosen to be 10 mm for 38 GHz channel spacing, at which the nominal distance between SIR ports on one face of the slab is 13 mm.

Figure 3A:
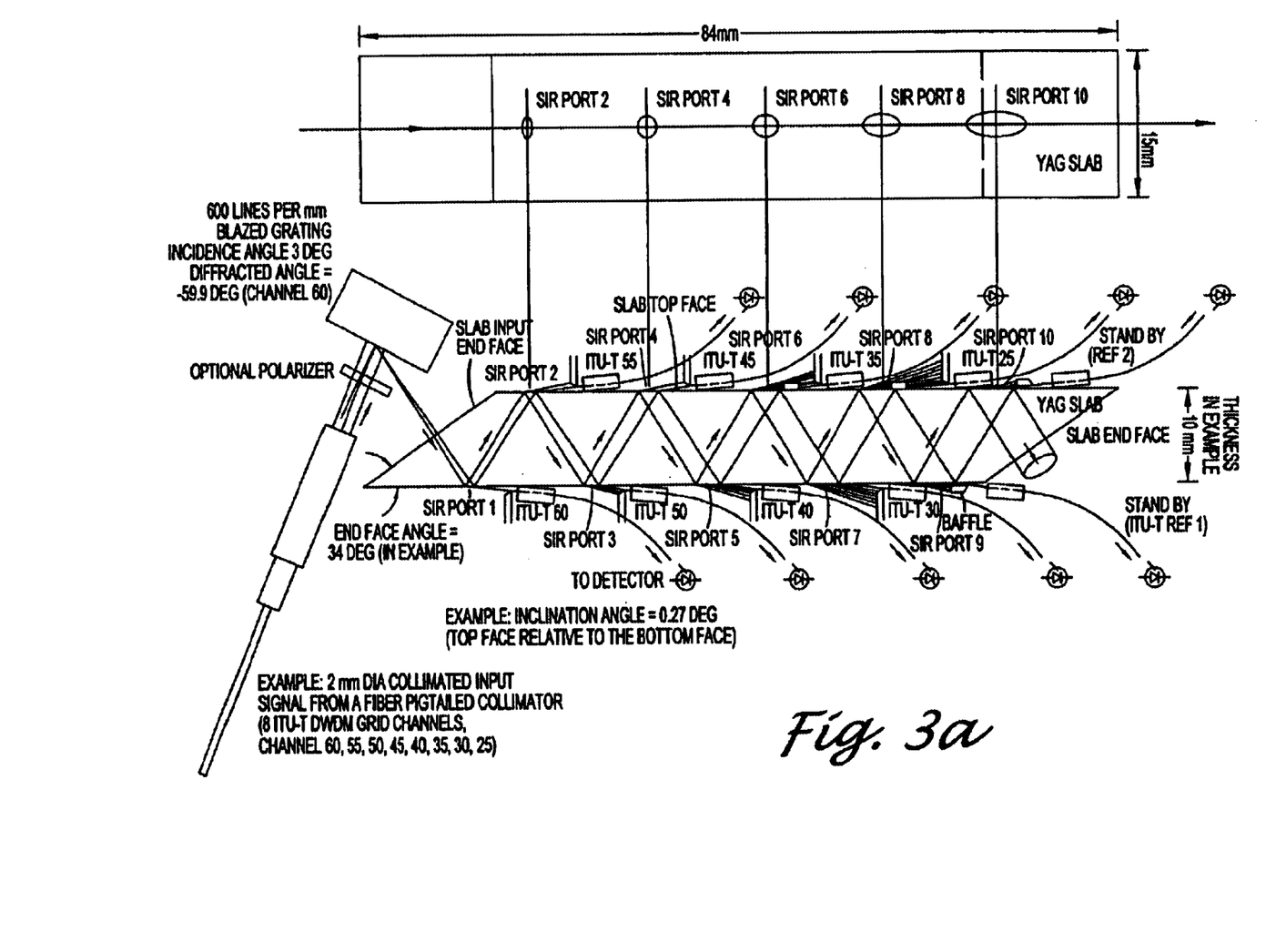
FIG. 3a is a schematic of a eight-channel WDM receiver or spectrum analyzer employing an array of fiber-coupled detectors, collecting optics and baffles in physical proximity of the slab internal reflection (SIR) ports.

FIG. 3a is a schematic of a eight-channel receiver/spectrum analyzer example employing an array of fiber-coupled detectors, collecting optics and baffles in physical proximity of the slab internal reflection (SIR) ports. Having described the principle of operation of the demultiplexer previously, we will skip the design details and point out the key elements of the receiver. The input fiber carries eight channels on the ITU-T DWDM grid, which for this design example, are channels 60, 55, 50, 45, 40, 35, 30 and 25 with channel to channel wavelength separation of ~4 nm or 500 GHz. The collimated beam from the input optical fiber is incident on a blazed grating with 600 lines per mm at an incidence angle of 3 degree. The output beams are then angularly separated with the diffracted angles varying between negative 59.93 deg and negative 61.89 deg between channel 60 and channel 25. The output beams enter the slab through the end face, which is at near normal incidence and anti-reflection coated to provide low loss for the signal. The beams are then incident on the bottom surface of the slab at SIR port 1. The critical angle for the slab-air combination is 33.329 deg. The incidence angles vary from 33.218 deg for channel 60 to 34.298 deg for channel 25. Assuming the input beam is not polarized, 34% of channel 60 exits the slab at a transmitted angle of 85.6 deg from port 1. For parallel polarized beam the transmission fraction increase to 49%. The beams travel to the top surface which is inclined at an angle of 0.15 deg with respect to the bottom surface. The incidence angles are decreased by 0.15 deg for all the channels, and channel 55 along with a small fraction of channel 60 are transmitted at SIR port 2. The aspect ratio of the beam changes on transmission, and the beams become flattened in the propagation plane. The beam size in the direction of the slab width does not change. The angular separation between channel 60 and 55 at port 2 is 2.3 deg, and a short propagation length from the top slab surface separates the two transmitted beams in physical space. The process continues until all the channels exit the slab through the SIR ports.

The optical slab for this example is made of YAG, is 15 mm wide, 10 mm thick and 84 mm long. The end faces are at 34 deg, and are AR coated for near normal incidence input beam. For this design with eight wavelength channels, the slab is designed with ten SIR ports. Ports 9 and 10 at the end may be used for two reference channels, which have wavelengths at ITU-T DWDM channel 20 and 15. If the grating becomes misaligned with the slab, or if there is variation in the temperature, or if there is fabrication error, the measured intensities of these reference channels at these ports and the relative intensities between them will vary. The intensity signals at these diagnostic ports can be used to provide feedback on physical alignment of the entire demultiplexer for optimization of coupling to the receivers at the demultiplexed wavelength channels.

For this design, the slab inclination angle, $\theta_{inclination}$ is 0.148 deg, and can be in the range of 0.12 deg and 0.17 deg. The fabrication tolerance is well within the state of the art in optical slab fabrication. When the slab inclination angle is between 0.12 deg and 0.14 deg, no new channels reach transmission at some exit SIR port. Instead, the internally reflected beam proceeds to the next port, where the incidence angle is further minimized, to allow transmission of the next channel. In this way, in this particular example, eight channels are accessed at eight SIR ports out of the ten provided. In some cases, the same channel may be monitored at two successive ports if needed. On the other hand, when the slab inclination angle exceeds 0.17 degree, two channels reach transmission condition simultaneously at one SIR port, and this situation is avoided in this design. In an alternate design, it is entirely possible to have more than one demultiplexed channel from any SIR port, since the channels are angularly separated.

For this particular example, the coupling optics shown consists of a gradient index lens (2 mm diameter×4 mm long) which has the requisite pitch to focus a collimated beam incident on one end to a spot on its other end. The beam is flattened in one dimension in the plane of incidence, due to the transmission angle being close to 90 degree. Since the beam does not use the full aperture in one dimension, the gradient index lens may be truncated in that dimension without reducing coupling fraction. The lens is brought at an angle, and to within 0.1 mm of the slab, such that the central axis of the lens is aligned with the transmitted beam. The distance between the input face of the lens and the SIR port is designed to allow physical separation of the adjacent channels. As shown in the figure, a baffle is placed to block the beams from other wavelength channels from entering the coupling lens. A fiber with typical 300 micron jacket diameter is coupled to the end of the lens and serves as the receiving fiber of the wavelength channel. The fiber is bent slightly and well within the limits of its allowable bend radius to clear the adjacent coupling optics. The distance between two adjacent SIR ports on one side of the slab is typically 13 mm for this example, which as shown in the figure is adequate to accommodate the coupling optics and to implement physical separation of constituent wavelength channels.

Each fiber is coupled to a detector. For telecom application, a representative detector is a fiber-coupled InGaAs Schottky diode detector, model 102-X, from New Focus Corporation. The array of fiber coupled detectors along with the grating/slab demultiplexer leads to the construction of a multichannel receiver or spectrum analyzer for DWDM and other applications.

Figure 3B:
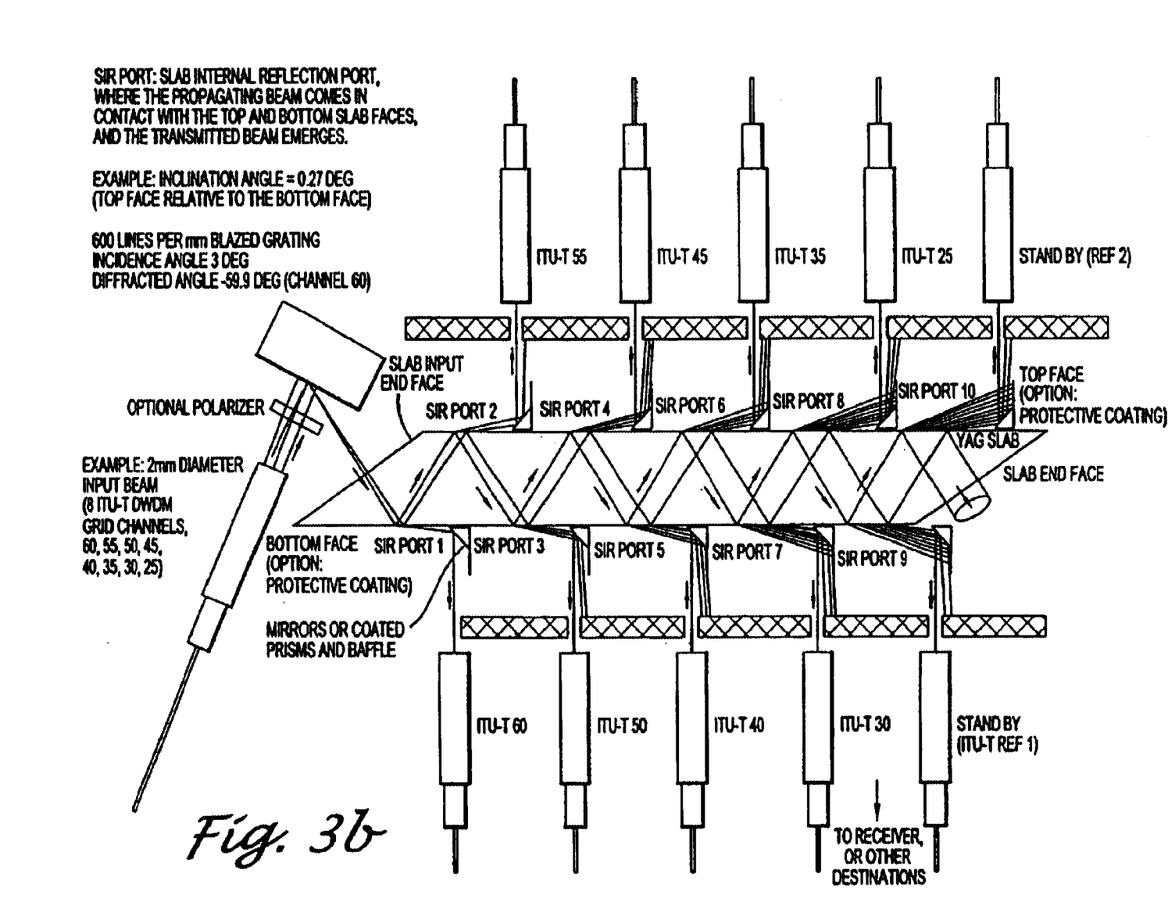
FIG. 3b is the schematic of an eight channel demultiplexer/router based on a variation of a multi-channel receiver shown in FIG. 3a, employing an array of beam diverting mirrors in proximity of the SIR ports, an array of fibers with collection optics and baffles.

FIG. 3b is the schematic of a demultiplexer/router based on a variation of a multi-channel receiver shown in FIG. 3a, employing an array of beam diverting mirrors in proximity of the SIR ports, and an array of fibers with collection optics and baffles. In this design, a small mirror or a prism with reflective coating on one of the faces is located near each SIR port to divert the transmitted beam away from the slab axis to a set of fibers equipped with collecting lenses (such as fiber pigtailed collimators as described in FIG. 1a. Baffles can be placed near the slab and near the receiver fibers to eliminate the undesired channels entering the receiver fiber. In this particular example, the transmitted beams travel a distance from the slab surface to reach the receiver fibers, during which the adjacent channels become physically separated, and the cross talk between adjacent channels is significantly reduced using baffles. This example illustrates the design and operation of a wavelength demultiplexer/router, in which eight wavelength channels in the ITU-T DWDM grid from a common carrier fiber is demultiplexed, and routed to eight receiver fibers with each fiber carrying a separate wavelength channel. The receiver fibers may be coupled to detectors to form a multichannel receiver or spectrum analyzer for telecommunication and other applications.

Figure 3C:
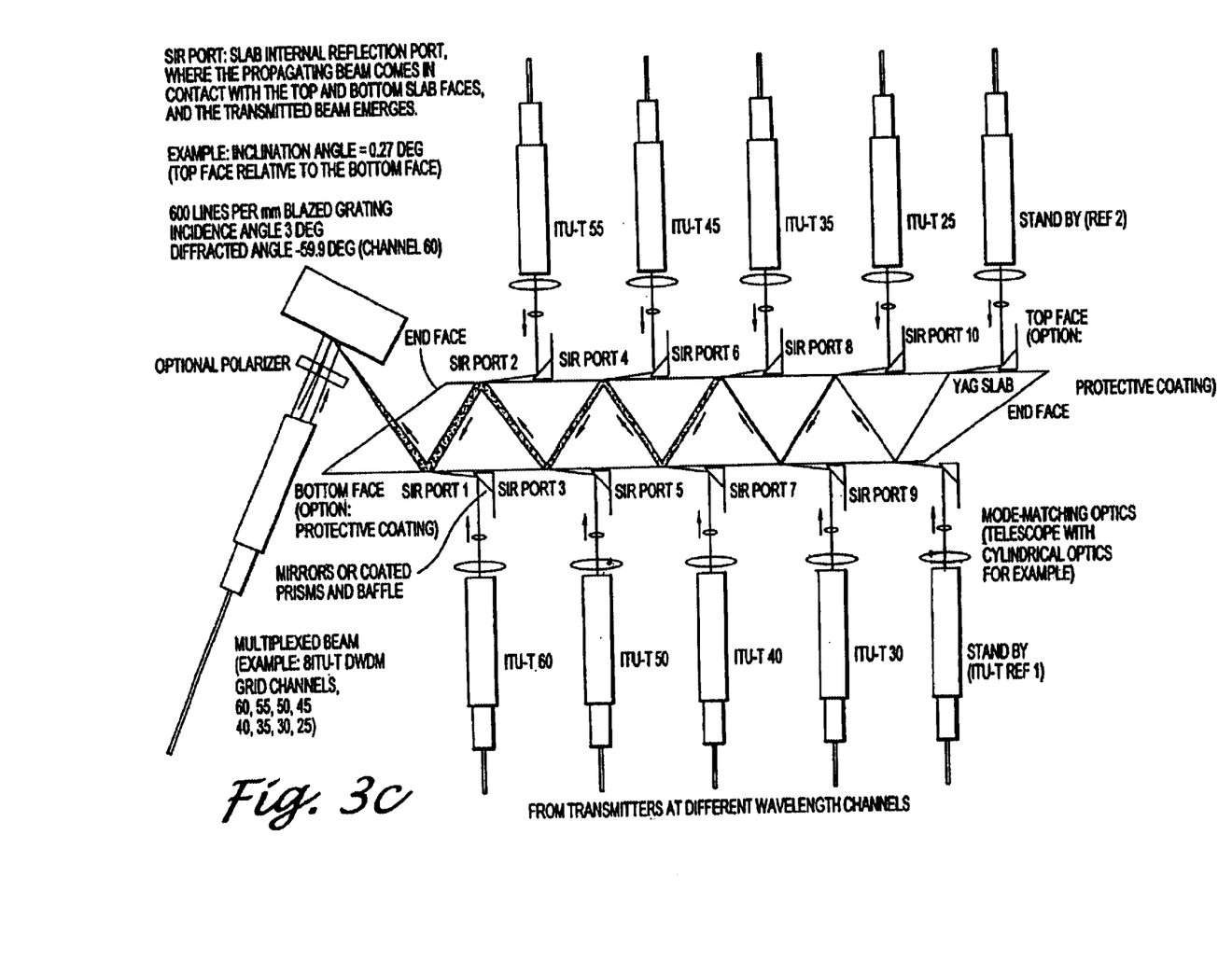
FIG. 3c is the schematic of an eight channel multiplexer/router based on a variation of the demultiplexer/router shown in FIG. 3b, in which the beams of different wavelengths from different fibers get combined in the optical slab and grating combination to an output fiber containing all the channels.

FIG. 3c is the schematic of a multiplexer/router based on a variation of the demultiplexer/router shown in FIG. 3b, in which the beams of different wavelengths from different fibers get combined in the optical slab and grating combination to an output fiber containing all the channels. Consider the same wavelengths and operating conditions as in FIG. 3b. Now consider that the input beam is turned off, and the receiving fibers are used as input (transmitting) fibers to bring in the DWDM ITU-T grid channels 60, 55, 50, 45, 40, 35, 30 and 25 at exactly the same fibers where they were being received in FIG. 3b. Consider that the beams from these input fibers are reshaped to match in shape, divergence and size the beams exiting the SIR ports in FIG. 3b. This can be accomplished by a set of cylindrical optics for example to form a telescope in one dimension, while the other beam dimension remains unchanged. The input beams enter the slab through the eight SIR ports, are reshaped within the slab, is incident at a range of angles on the grating, is combined by diffraction at the grating, and is coupled into one fiber which was the input fiber in FIG. 3b. This explains the operation of the method and apparatus as a DWDM multiplexer.

Figure 4:
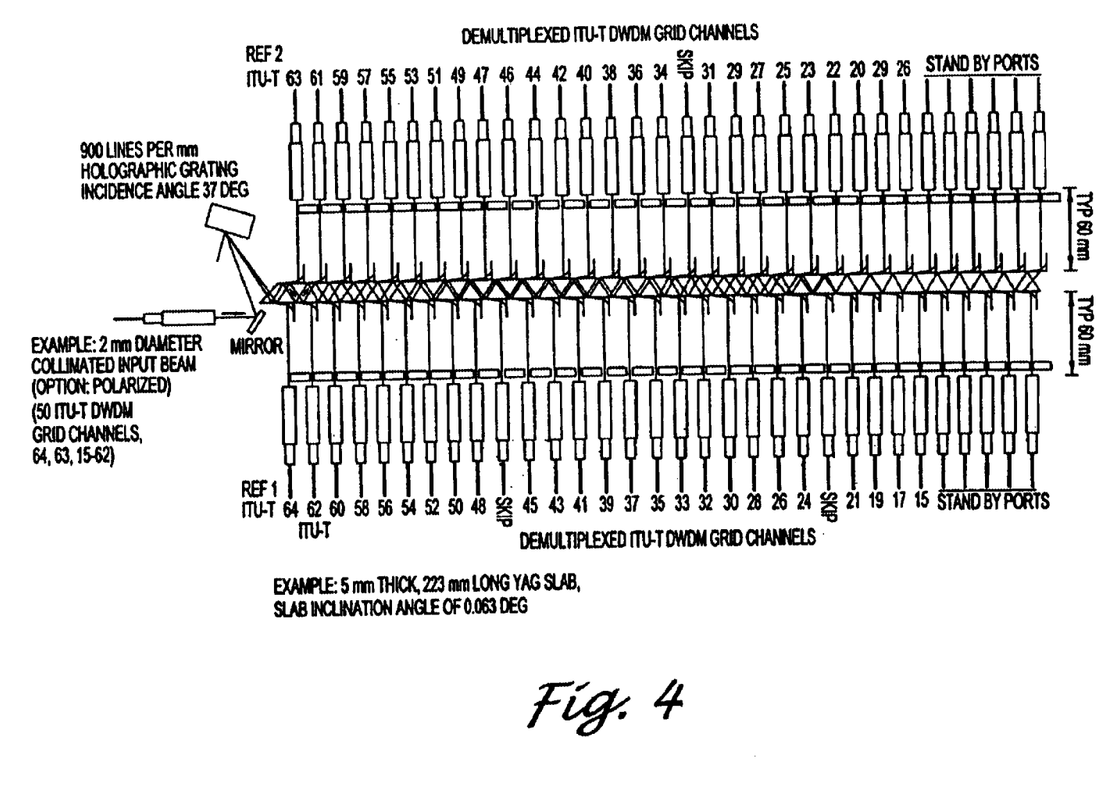
FIG. 4 is a schematic showing the feasibility of a 48-channel ITU-T DWDM grid demultiplexer/receiver with similar beam coupling configuration as shown for the demultiplexer/router in FIG. 3b.

FIG. 4 is a schematic showing the feasibility of a 48-channel ITU-T DWDM grid demultiplexer/receiver with similar beam coupling configuration as shown for the demultiplexer/router in FIG. 3b. The principle of operation is the same as was described for FIG. 3a with the following differences. The input fiber carries forty eight channels on the ITU-T DWDM grid, which for this design example, are channels 62 down to 15 with channel to channel wavelength separation of −0.8 nm or 100 GHz. The input beam also contains two wavelength alignment reference signals at channel 63 and 64. The collimated beam from the input optical fiber is incident on a holographic grating with 900 lines per mm at an incidence angle of 37 degree at which the grating resolution is 0.68 nm. The output beams enter the slab through the end face, which is antireflection coated to provide low loss for the signal.

The optical slab for this example is made of YAG, is 15 mm wide, 5 mm thick and 223.2 mm long. The end faces are at 45 deg, and are AR coated for near normal incidence input beam. For this design with forty eight wavelength channels, the slab is designed with sixty four SIR ports. Ports 1 and 2 may be used for two wavelength alignment reference channels, which have wavelengths at ITU-T DWDM channels 64 and 63 as described earlier. For this design, the slab inclination angle, $\theta_{inclination}$ is 0.035 deg, and can be in the range of 0.029 deg and 0.037 deg. The fabrication tolerance is within the state of the art in optical slab fabrication.

The incidence angle for channel 62 is 33.409 deg at SIR port 1. The demultiplexing of the input signal continues within the optical slab, and the demultiplexed beams exit at ports 3 thru 64. For this design, if the transmission angle for any demultiplexing channel exceeds 88 degree at any SIR port, that port is not used, instead the channel is demultiplexed at the next SIR port, at which the incidence angle and transmission angle are reduced, and transmission fraction is increased. For any demultiplexer output channel, the baffles are designed to let in radiation at a specific angle corresponding to the output channel, and, to block adjacent channels at both shorter and longer wavelenghts. At the incidence angles and slab inclination angles mentioned earlier for this example, the receivers at SIR ports 16, 35, and 46 will not be used, and demultiplexed channels will appear at SIR ports 3–15, 17–34, 36–45 and 47–53. For variation in incidence angle or slab inclination angle, the demultiplexed channels will be accessed in other combinations of SIR ports 3 through 64. In this particular example, the receiver fibers are located at greater than 60 mm from the SIR ports. The transmitted angle between the desired channel and its adjacent channels is typically ~1.1 degree at a SIR port, and a short propagation distance will sufficiently separate out the central axes of the two beams, which is adequate for significantly suppressing cross talk between channels. This design illustrates the operation of a wavelength router, in which forty eight wavelength channels in the ITU-T DWDM grid from a common carrier fiber is demultiplexed, and routed to forth eight receiver fibers with each fiber carrying a separate wavelength channel. The receiving fibers may be coupled to detectors to form a multichannel receiver or spectrum analyzer for telecommunication and other applications.

What is claimed is:

1. A method for wavelength demultiplexing of a plurality of inputted optical signals having different corresponding wavelengths, said method comprising:
   a) angularly dispersing said inputted optical signals based on the signal wavelength;
   b) directing each of said optical signals to a plurality of reflecting surfaces, each of said reflecting surfaces being arranged at a dedicated angle of inclination such that each is transmissive only to the optical signal having a corresponding angle of dispersion, while remaining substantially reflective to other signals; and
   c) directing said extracted signals to a plurality of signal carrier mediums for transmission to at least one predetermined destination.

2. The method of claim 1, wherein said inputted signals are inputted from at least one of optical fibers and free space.

3. The method of claim 1, wherein said signal carrier medium is one of optical fibers and free space.

4. The method of claim 1, wherein said angular dispersing occurs in an optical grating medium.

5. The method of claim 1, wherein said angular dispensing occurs in a prism.

6. The method of claim 1, wherein said plurality of reflecting surfaces are arranged in an optical medium slab.

7. The method of claim 6, wherein said optical medium is a nonlinear optical medium slab constructed of at least one nonlinear optical material.

8. The method of claim 6, said optical slab comprising:
   a bottom surface, wherein said optical signals to be extracted in said extracting enter the slab at a predetermined angle of inclination and propagate through the slab by being reflected between said surfaces wherein an angle of incidence for each signal is varied with each reflection from said surfaces.

9. The method of claim 8 wherein said dedicated angle is an angle of said surfaces relative to each other.

10. The method of claim 8, wherein said angle of incidence for each signal is in substantial proximity of a critical angle for said signals.

11. The method of claim 6, said directing further comprising:
   a) directing each said extracted signals to a coupling diverting optics positioned between said optical slab and said signal carrier medium wherein said coupling optics amplifying and diverting said extracted signals to an entrance of said signal carrier medium; and
   b) positioning optical baffles in substantial proximity of said entrance to block unwanted radiation from entering the signal carrier medium based on angular dispersion.

12. The method of claim 11 wherein said coupling diverting optics are optical mirrors.

13. The method claim 11 wherein said diverting further comprising:
   diverting said extracted signals to at least one wavelength router for routing to said signal carrier medium.

14. A method for wavelength multiplexing of a plurality of inputted optical signals having different corresponding wavelengths, said method comprising:
   a) directing said inputted signals from a plurality of signal carrier medium to enter an optical medium at a corresponding predetermined entrance point;
   b) confluxing each of said entered signals by directing said optical signals to a plurality of reflecting surfaces, each of said reflecting surfaces being arranged at a dedicated angle of inclination to become substantially transmissive to an entered signal at said predetermined entrance point while remaining substantially reflective to other signals; and
   c) angularly collimating and physically overlapping said confluxed optical signals into a multiplexed signal and directing said multiplexed signal to a signal carrier medium.

15. The method of claim 14, wherein said inputted signals are inputted from at least one of optical fibers and free space.

16. The method of claim 14, wherein said signal carrier medium is at least one of optical fibers and free space.

17. The method of claim 14, wherein said angular collimating and physical overlapping occurs in an optical grating medium.

18. The method of claim 14, wherein said angular collimating and physical overlapping occurs in a prism.

19. The method of claim 14, wherein said plurality of reflecting surfaces are arranged in an optical medium slab.

20. The method of claim 19, wherein said optical medium slab is a nonlinear optical medium slab constructed of at least one nonlinear optical materials.

21. The method of claim 19, said optical medium slab comprising:
a top surface and a bottom surface, wherein said optical signals to be confluxed in said confluxing enter the slab at a predetermined angle of inclination of said slab and propagate through the slab by being reflected between said surfaces wherein an angle of incidence for each signal is varied with each reflection from said surfaces.

22. The method of claim 21 wherein said dedicated angle of inclination is an angle of said surfaces relative to each other.

23. The method of claim 21, wherein said angle of incidence for each signal remains in substantial proximity of a critical angle for said signals.

24. The method of claim 19, said directing further comprising:
directing each said inputted signal to a coupling diverting optics positioned between said signal carrier medium and said optical slab wherein said coupling optics amplify and divert said inputted signal to a predetermined entrance point in said slab.

25. The method of claim 24, wherein said coupling diverting optics are optical mirrors.

26. The method claim 24, said diverting further comprise:
diverting each said inputted signal from at least one wavelength router in optical communication with said signal carrier medium to said predetermined entrance point in said slab.

27. An apparatus for wavelength demultiplexing of a plurality of inputted optical signals having different corresponding wavelengths, said apparatus comprising:
a) an angular dispersion device to angularly disperse said inputted optical signals based on the signal wavelength;
b) a signal extraction device to extract each of said signals by directing said optical signals to a plurality of reflecting surfaces, each of said reflecting surfaces being arranged at a dedicated angle of inclination wherein the dispersion angle of each optical signal causes a reflective surface arranged at a corresponding angle of inclination to become substantially transmissive to a signal to be extracted while remaining substantially reflective to other signals; and
c) a beam directing device to direct said extracted signals to a plurality of signal carrier mediums for transmission to at least one predetermined destination.

28. The apparatus of claim 27, wherein said inputted signals are inputted from at least one of optical fibers and free space.

29. The apparatus of claim 27, wherein said signal carrier mediums include at least one of optical fibers and free space.

30. The apparatus of claim 27, wherein said angular dispersion device is an optical grating medium.

31. The apparatus of claim 27, wherein said angular dispersion device is a prism.

32. The apparatus of claim 27, wherein said plurality of reflecting surfaces are arranged in an optical medium slab.

33. The apparatus of claim 32, wherein said optical medium slab is a nonlinear optical medium slab constructed of at least one nonlinear optical material.

34. The apparatus of claim 32, said optical medium slab comprises:
a top surface and a bottom surface, wherein said optical signals to be extracted in said extraction device enter the slab at a predetermined angle of inclination and propagate through the slab by being reflected between said surfaces wherein an angle of incidence for each signal is varied with each reflection from said surfaces.

35. The apparatus of claim 34 wherein said dedicated angle of inclination is an angle of said surfaces relative to each other.

36. The apparatus of claim 34, wherein said angle of incidence for each signal remaining in substantial proximity of a critical angle for said signals.

37. The apparatus of claim 32, said beam directing device further comprising:
a) at least one coupling diverting optics device positioned between said optical slab and said signal carrier medium wherein said coupling optics receive, amplify and divert said extracted signals to an entrance of said signal carrier medium; and
b) at least one optical baffle positioned in substantial proximity of said entrance to block unwanted radiation from entering the signal carrier medium based on angular dispersion.

38. The apparatus of claim 37 wherein said coupling diverting optics are optical mirrors.

39. The apparatus claim 37 wherein said beam directing device diverts said extracted signals to at least one wavelength router for routing to said signal carrier medium.

40. An apparatus for wavelength multiplexing of a plurality of inputted optical signals having different corresponding wavelengths, said apparatus comprising:
a) a beam directing device to direct said inputted signals from a plurality of signal carrier mediums to enter an optical confluxing medium at a corresponding predetermined entrance point, said optical medium having a plurality of reflecting surfaces, each of said reflecting surfaces being arranged at a dedicated angle of inclination to become substantially transmissive to an entered signal at said predetermined entrance point while remaining substantially reflective to other signals, said medium being operative to conflux said inputted signals; and
b) an angular collimating device to angularly collimate and physically overlap said confluxed optical signals based on the signal wavelength angularly and to direct said waveform to a signal carrier medium.

41. The apparatus of claim 40, wherein said inputted signals are inputted from at least one of optical fibers and free space.

42. The apparatus of claim 40, wherein said signal carrier medium is at least one of optical fibers and free space.

43. The apparatus of claim 40, wherein said angular collimating and physical overlapping occurs in an optical grating medium.

44. The apparatus of claim 40, wherein said angular collimating device is a prism.

45. The apparatus of claim 40, wherein said plurality of reflecting surfaces are arranged in an optical medium slab.

46. The apparatus of claim 40, wherein said optical medium slab is a nonlinear optical medium slab constructed of at least one nonlinear optical materials.

47. The apparatus of claim 45, wherein said optical medium slab comprises:

a top surface and a bottom surface, wherein said optical signals to be confluxed in said confluxing medium enter the slab at a predetermined angle of inclination of said slab and propagate through the slab by being reflected between said top and bottom surfaces, and wherein an angle of incidence for each signal is varied with each reflection from said surfaces.

48. The apparatus of claim 40 wherein said dedicated angle is an angle of said surfaces relative to each other.

49. The apparatus of claim 47, wherein said angle of incidence for each signal remaining in substantial proximity of a critical angle for said signals.

50. The apparatus of claim 45, wherein said beam directing device directs each said inputted signal to a coupling diverting optics positioned between said signal carrier medium and said optical slab, and wherein said coupling optics amplifies and diverts said inputted signal to said predetermined entrance point in said slab.

51. The apparatus of claim 50 wherein said coupling diverting optics are optical mirrors.

52. The apparatus claim 50 wherein said coupling diverting optics divert each said inputted signal from at least one wavelength router in optical communication with said signal carrier medium to said predetermined entrance point in said slab.

* * * * *